United States Patent Office 3,370,035
Patented Feb. 20, 1968

3,370,035
STABILIZATION OF POLYALKYLENE OXIDE
Junji Ogura, Minoo, Japan, and Yataka Matsui, Ashiya, Japan, assignors to Takeda Chemical Industries, Ltd., Osaka, Japan
No Drawing. Original application June 23, 1961, Ser. No. 119,051. Divided and this application July 23, 1964, Ser. No. 402,373
Claims priority, application Japan, July 11, 1960, 35/31,478
5 Claims. (Cl. 260—45.75)

ABSTRACT OF THE DISCLOSURE

Polyalkylene oxide (polyethylene oxide, polypropylene oxide, etc.) is stabilized against deterioration by heat or during storage by the uniform incorporation therein of a sulfur-containing compound (e.g. ethylene thiourea (2-mercapto-imidazoline), zinc dibutyldithiocarbamate, nickel dibutyldithiocarbamate, zinc ethylphenyldithiocarbamate, etc.), as a stabilizer.

---

The present application is a division of copending application Ser. No. 119,051, filed June 23, 1961 (now abandoned).

This invention relates to stabilization of polyalkylene oxide, more particularly to a novel technique of stabilizing polyalkylene oxide by the addition of a compound having in its structure at least one sulfur atom.

Polyalkylene oxide is a high molecular compound useful in many applications, e.g. plastic industry, fiber industry and pharmaceutical industry, as a valuable dispersion supplement, plasticizer, thickener and binder, for instance. Although the polymer may be synthesized via various known processes it is apt to degrade into lower molecular weight compounds at high temperature or during storage for long periods of time, regardless of the process or catalyst employed in its preparation. Such an unstable nature of the polymer is easily understandable from its chemical structure.

Such being the case, in order to keep the chemical and physical properties of the polymer constant while processing at high temperature or during storage, suitable stabilizers for preventing degradation of the polymer have been investigated by many researchers. The present inventors have also searched for effective stabilizers which are suitable for preventing the degradation of the polymer under heating as well as during storage. For the purpose, the present inventors have studied the stability of the polymer under co-existence with many kinds of other compounds, and found that the compounds having at least one sulfur atom have strong stabilizing effects on polyalkylene oxide, in other words, they substantially prevent the degradation of the polymer at room- or high-temperatures.

An object of the present invention is to provide a method for preventing polyalkylene oxide from degradation by heating or during storage. Another object is to provide a stabilized polyalkylene oxide composition. These objects are realized by the addition of one or more compounds having at least one sulfur atom to polyalkylene oxide in various forms.

As the stabilizer of the present invention, there may be used ethylene thiourea (2-mercapto-imidazoline), zinc ethylphenyldithiocarbamate, nickel dibutyldithiocarbamate and zinc dibutyldithiocarbamate.

In the present invention, the stabilizers may be used solely or in combination, and if necessary or desired they may be employed together with another known stabilizer for polyalkylene oxide.

The polyalkylene oxide to be stabilized in the present invention includes e.g. polyethylene oxide and polypropylene oxide, at any degree of polymerization. Moreover, so-called "block copolymer" having optional intrinsic viscosity may also be stabilized by the method of this invention. The constituents of the block copolymer may be e.g. ethylene oxide and propylene oxide. The polymer to be stabilized may be in the form of solid, paste or liquid, or in any other form. Moreover, a mixture composed of the polymer and other substances or a processed article of the polymer which may be contaminated with other material or a solution of the polymer or the like can also be stabilized by the method of this invention. The addition of the aforesaid stabilizer to the polymer may conveniently be carried out in a manner similar to that of known stabilizers. Concretely, when the polymer to be stabilized is in solid form, the stabilizer may be added to its solution or suspension in a proper solvent such as benzene, acetonitrile or water. The solvent may then be distilled off, if necessary. The solid polymer may also be kneaded with the stabilizer. The addition may be carried out before or during or after the processing of the polymer.

The quantity of the stabilizer which can exhibit the objective stabilizing effect on the polymer is at least 0.5% by weight relative to the polyalkylene oxide to be stabilized, and the most preferable quantity is generally found between 0.5 to 5% by weight.

Polyalkylene oxide thus stabilized or a mixture containing it or their processed articles are effectively prevented from degradation or depolymerization even when they are processed or handled under heating or stored for a long time at room temperature. Namely, by the addition of the stabilizer in the method of this invention, decomposition or depolymerization of polyalkylene oxide is substantially inhibited at room or high temperature.

Stabilizing effect on polyalkylene oxide of the stabilizer of this invention was observed in comparison with that of several known stabilizers. For purposes of comparison, the stability of polyalkylene oxide was observed without the addition of any stabilizer. The method and the results are shown below.

Specimens of polyalkylene oxide:

(1) Polyethylene oxide whose molecular weight is 2,000,000.

(2) Polypropylene oxide whose molecular weight is about 1,000,000.

Method of measurement:

The polyalkylene oxide is dissolved in distilled water (for polyethylene oxide) or in benzene (for polypropylene oxide) to prepare its 0.1% solution (percentage is by weight). To 200 milliliters of the solution in a bottle is added 5 milligrams of the stabilizer to be examined, then the mixture is kept standing at 90° C. for 24 hours. Before and after heating, the viscosity of each sample is measured by "Ubbelohde's Viscosimeter." From the viscosity of each sample, the degree of degradation was calculated.

Results:

| Stabilizer | Degree of degradation in percent | |
|---|---|---|
| | Polyethylene oxide | Polypropylene oxide |
| 2-mercapto-imidazoline | 4.7 | 5.2 |
| Zinc ethylphenyldithiocarbamate | 3.9 | 4.3 |
| Zinc dithiocarbamate | 7.9 | 6.8 |
| Zinc dimethyldithiocarbamate | 9.2 | 8.5 |
| Zinc dimethyldithiocarbamate | 12.2 | 12.8 |
| Normalpropyl gallate | 84.7 | 90.6 |
| Paranitrosodiphenylamine | 70.6 | 81.5 |
| Paraphenylenediamine | 52.3 | 40.8 |
| Hydroquinone | 89.8 | |
| Control | 97.4 | 96.5 |

Another experiment similar to the above was conducted to prove the stabilizing effect of the stabilizer of this invention on a so-called "block copolymer." The specimen, method and results are as in the following:

Specimen of block copolymer:

A block copolymer, whose intrinsic viscosity is 5.0, consisting of 80 parts by weight of ethylene oxide and 20 parts by weight of propylene oxide.

Method:

A mixture composed of one gram of the specimen and 15 milligrams of the stabilizer to be examined is kept standing at 90° C. for 24 hours. Then, the change of the intrinsic viscosity of each sample is observed.

Results:

| Stabilizer | Intrinsic viscosity | Degree of degradation in percent |
|---|---|---|
| 2-mercapto imidazoline | 5.0 | 0 |
| Zinc ethylphenyldithiocarbamate | 4.6 | 8.0 |
| Zinc dibutyldithiocarbamate | 4.8 | 4.0 |
| Di-(o-benzamidophenyl)-disulfide | 4.5 | 10.0 |
| Nickel dibutyldithiocarbamate | 4.9 | 2.0 |
| Paraphenylenediamine | 2.6 | 48 |
| Nitrosodiphenylamine | 3.1 | 38 |
| Control | 2.5 | 50.0 |

From the above results, it can be understood that the stabilizers of the present invention have very excellent effects in stabilizing the polyalkylene oxide. Moreover, it is advantageous that the polyalkylene oxide to which the stabilizer has been added can be processed without the addition of plasticizer or softener. And, it is another advantage that the polymer can be used or stored without decomposition or depolymerization at room or high temperature or in humid places.

The present method is not restricted by the form, purity, and degree of polymerization of the polyalkylene oxide, nor by the time of addition of the stabilizer.

The following example represents presently preferred embodiments of the invention. In the example, all percentages are in weight percent, temperatures are shown in degrees centigrade, and the relationship between part by weight and part by volume is the same as that between gram and milliliter.

EXAMPLE 1

Polyethylene oxide whose average molecular weight is about 2,000,000 is dissolved in distilled water to make its 0.1% aqueous solution. To 200 milliliters of the solution is added 5 milligrams of 2-mercaptoimidazoline, then the solution is sufficiently agitated. Upon evaporation of the water from the mixture, stabilized polyethylene oxide is obtained.

In the same manner as above, polypropylene oxide can be stabilized by means of thiourea. And, similar results can be obtained, when ethylene, zinc ethylphenyldithiocarbamate or zinc dibutyldithiocarbamate is used instead of 2-mercapto-imidazoline.

Having thus disclosed the invention, what is claimed is:

1. Stabilized polyalkylene oxide which consists essentially of polyalkylene oxide selected from the group consisting of polyethylene oxide, polypropylene oxide and block polymer composed of polyethylene oxide and polypropylene oxide and of at least 0.5% relative to the weight of the polyalkylene oxide, substantially uniformly distributed in the latter, of zinc ethylphenyldithiocarbamate.

2. Stabilized polyalkylene oxide which consists essentially of polyalkylene oxide selected from the group consisting of polyethylene oxide, polypropylene oxide and block polymer composed of polyethylene oxide and polypropylene oxide and of at least 0.5% relative to the weight of the polyalkylene oxide, substantially uniformly distributed in the latter, of zinc diethyldithiocarbamate.

3. Stabilized polyalkylene oxide which consists essentially of polyalkylene oxide selected from the group consisting of polyethylene oxide, polypropylene oxide and block polymer composed of polyethylene oxide and polypropylene oxide and of at least 0.5% relative to the weight of the polyalkylene oxide, substantially uniformly distributed in the latter, of zinc dimethyldithiocarbamate.

4. Stabilized polyalkylene oxide which consists essentially of polyalkylene oxide selected from the group consisting of polyethylene oxide, polypropylene oxide and block polymer composed of polyethylene oxide and polypropylene oxide and of at east 0.5% relative to the weight of the polyalkylene oxide, substantially uniformly distributed in the latter, of nickel, dibutyldithiocarbamate.

5. Stabilized polyalkylene oxide which consists essentially of polyalkylene oxide selected from the group consisting of polyethylene oxide, polypropylene oxide and block polymer composed of polyethylene oxide and polypropylene oxide and of at least 0.5% relative to the weight of the polyalkylene oxide, substantially uniformly distributed in the latter, of 2-mercapto-imidazoline.

References Cited
UNITED STATES PATENTS

| | | | |
|---|---|---|---|
| 2,624,708 | 1/1953 | Langer et al. | 252—49.3 X |
| 2,897,178 | 6/1959 | Hill | 260—45.9 |
| 3,201,367 | 8/1965 | Smith | 260—611.5 X |

DONALD E. CZAJA, *Primary Examiner.*

M. J. WELSH, *Assistant Examiner.*